(12) United States Patent
Waibel et al.

(10) Patent No.: US 6,282,028 B1
(45) Date of Patent: Aug. 28, 2001

(54) BEAMSPLITTER

(75) Inventors: Reinhard Waibel, Berneck; Wilfried Piske, Heerbrugg; Erwin Bünter, Eichberg, all of (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/598,535

(22) Filed: Jun. 21, 2000

(30) Foreign Application Priority Data

Jun. 26, 1999 (DE) ................................................ 199 29 436

(51) Int. Cl.⁷ ........................... G02B 27/10; G02B 27/30
(52) U.S. Cl. ............................................. 359/618; 359/641
(58) Field of Search ..................................... 359/618, 629, 359/636, 638, 641

(56) References Cited

U.S. PATENT DOCUMENTS 4,306,782 * 12/1981 Murray .................................. 353/121
4,563,058 * 1/1986 Yardy ................................... 350/166
5,144,487 * 9/1992 Hersey .................................. 359/629

* cited by examiner

Primary Examiner—Ricky Mack
(74) Attorney, Agent, or Firm—Sidley Austin Brown & Wood, LLP

(57) ABSTRACT

A beamsplitter for splitting a light beam in a plurality of separate beams, and having at least two reflecting surfaces (6; 26) inclined each at an angle of 45° to a propagation direction of a collimated primary light beam (P) emitted by a light source (1), forming a right angle with each other, located at a same distance from a collimator (2) for collimating the primary light beam, and extending into a path of the collimated light beam for emitting two output beams; and a light passage (9, 10; 29) provided in a space between the reflecting surfaces (6, 26) and extending substantially symmetrical to an optical axis of the collimator for enabling passing through the passage a central portion (M) of the collimated primary light beam; and an alignment tool including the beamsplitter.

12 Claims, 2 Drawing Sheets

BEAMSPLITTER

BACKGROUND OF THE INVENTION

1. Field of the Invention

The present invention relates to a beamsplitter for splitting a light beam and including a plurality of reflecting surfaces arranged in a path of a collimated light beam and inclined to a propagation direction of the collimated light beam at an angle of 45° for splitting the collimated light beam into a plurality of output beams extending perpendicular to each other. The present invention also relates to an optical alignment tool including the above-described beamsplitter.

2. Description of the Prior Art

In the constructional industry, optical devices, which are based on the use of luminous, collimated light beams, are replacing more and more the known since long ago, mechanical devices which provide, by using a visual control, for alignment and measurement of positional accuracy of constructional elements, built-in elements, installations and so forth. Since the time the semiconductor industry was able to provide a large number of laser diode capable of emitting light in the visible spectrum, usually red, a number of measuring devices, which replaced the previously known mechano-visual devices and which offered new measurement possibilities, found their application in the constructional industry. Thus, alignment tools, which are capable of emitting a collimated laser ray beam having a distance range up to about 20 m, a maximum diameter of about 10 mm, and a deviation from a horizontal propagation of about 1 mm per 10 m, have found a wide acceptance. In these tool, a horizontal alignment of the laser ray beam takes place, as a rule, automatically due to the influence of the gravitational force of the construction itself or due to the use of an appropriate control circuit.

In addition to a horizontal alignment and leveling, there exists a need in the constructional industry to determine plumb or to mark an exact right angle. U.S. Pat. No. 5,144,487 discloses a laser alignment device for performing the above-mentioned tasks. The known laser device is capable of emitting three laser ray beams lying in a common horizontal plane and extending at a right angle to each other. In addition, the tool emits also two plumb beams. To generate horizontal and plumb laser ray beams, a plurality of mirrors are arranged inside the tool and which deviate a primary laser ray beam, which is emitted by a laser diode, in the desired directions. The deviating mirrors, which produce altogether five horizontal and plumb beams, are arranged in a path of the primary laser ray beam in a spaced relationship to each other. Because of the mirror arrangement, the three-dimensional system of coordinates, which is formed by the emitted laser ray beams, has a zero point displacement or error. This is because the horizontal beams and the plumb beams have different virtual origins. Up to the present, the manufacturers of such laser devices dealt with this problem by providing constructively for a zero point displacement of about 20 mm. This zero point displacement or error should be taken into account when effecting measurements with the known laser devices. During the use of these laser devices, failure to take the zero point error into account presents a not insignificant source of an erroneous measurement. Further, the mirrors for forming output beams from the primary laser ray beam need be precisely aligned which makes the assembly of the device rather difficult. In addition, the arrangement of separate mirrors is rather sensitive to shocks which presents a serious drawback, in particular when the device is used on a constructional site.

Accordingly, an object of the present invention is a beamsplitter for splitting a primary light beam in a plurality of separate beams without a zero point error of the separate beams.

Another object of the present invention is a beamsplitter which could be easily mounted in an optical alignment tool, in particular, in a laser alignment tool.

A further object of the present invention is a beamsplitter having a rigid construction and capable of being used on a constructional site.

SUMMARY OF THE INVENTION

These and other objects of the present invention, which will become apparent hereinafter, are achieved by providing a beamsplitter for splitting a light beam in a plurality of separate beams and including at least two reflecting surfaces inclined each at an angle of 45° to a propagation direction of a collimated primary light beam emitted by a light source, forming a right angle with each other, located at the same distance from a collimator for collimating the primary light beam, and extending into a path of the collimated light beam so that they emit two output beams. The inventive beamsplitter further includes a light passage provided in a space between the reflecting surfaces and extending substantially symmetrical to an optical axis of the collimator for enabling passing through the light passage a central portion of the collimated primary light beam.

The arrangement of reflecting surfaces in the path of the primary light beam permits to easily produce three output beams extending perpendicular to each other. The output beams, which are reflected from the reflecting surfaces, form, e.g., the orthogonal y- and z-axes. The central portion of the primary light beam, which passes unhindered through the beamsplitter, forms the x-axis. A system of Cartesian coordinates, which is produced in a manner described above, has a common virtual origin which is formed by the point of intersection of the extensions of the reflected output beams with the primary light beam a central portion of which passes through this intersection point. The position of the intersection point corresponds to the distance of the reflecting surfaces from the collimator. This completely eliminates the zero point error. The arrangement of reflecting surfaces at a right angle to each other and at the same distances from the collimator permits to obtain a robust construction of the optical element and facilitates mounting of the beamsplitter in an optical alignment tool. The sensitivity of the constructions to shocks is substantially reduced.

In order to eliminate an undesired reflection and to obtain precisely defined output beams, advantageously the alignment tool, in which the beamsplitter is mounted, includes a parting elements which separates the collimated primary light beam, before its splitting into a plurality of output beams, in a plurality of parallel primary separate beams.

In accordance with one embodiment of the present invention, the parting element is formed as an apertured diaphragm, which is arranged between the collimator and the beamsplitter, and the number of opening formed therein corresponds to the number of the reflecting surfaces of the beamsplitter increased by one. The provision of the additional opening takes into account the fact that in addition to the reflected output beams, a portion of the primary light beam passes unhindered through the beamsplitter for forming a third coordinate of the system of the Cartesian coordinates. Also, the openings of the apertured diaphragm permits to produce output beams with precisely determined diameters.

In accordance with a simplest embodiment of the present invention, the parting element is formed of a light-absorbing areas which surround each of the reflecting surfaces and which are formed by, preferably, vapor metal deposition. With this embodiment of the present invention, the spatial delimitation of separate primary beams is effected at the reflection regions, and a need in a special, separate parting element is eliminated.

In accordance with an advantageous embodiment of the present invention, the beamsplitter has four reflecting surfaces extending at a right angle to each other and arranged, preferably in a square. The four reflecting surfaces are equidistantly spaced form the collimator and extends into the path of the primary light beam so that the central portion of the primary light beam passes substantially unhindered through a central region of the beamsplitter defined by the reflecting surfaces. The four output beams, reflected from the reflecting surfaces, extend in a common plane which is perpendicular to the primary light beam. The four output beams have a common virtual origin and pairwise propagate in opposite directions. This produces "positive" and "negative" sections of respective coordinates. The beam that passes unhindered through the beamsplitter is likewise outputted from the same virtual arrangement, forming a "positive" section of the third coordinate of the system of virtual Cartesian coordinates.

An assembly-friendly beamsplitter, which is also insensitive to shocks, is formed when it is produced as an optical element, preferably as a one-piece truncated pyramid-shaped member, with side surfaces at least partially metal-coated for forming the reflecting surfaces, and having top and bottom surfaces extending parallel to each other and perpendicular to the propagation direction of the collimated primary light beam. The top and bottom surfaces define a passage for passing the central portion of the collimated primary light beam.

The optical element can be formed, e.g., as a glass body. The side surfaces of the truncated pyramid-shaped glass body can be metallized, e.g., by being coated with aluminum. In principle, the metallization is not absolutely necessary as a total reflection can be produced by forming completely reflecting surfaces. The glass body has a very small absorption with respect to the wave length of the primary light beam so that the central portion of the primary light beam can pass through the glass body substantially non-weakened.

In accordance with a preferred embodiment of the present invention, the truncated pyramid-shaped optical element has a bore which intersperses the top and bottom surfaces of the optical element. Because of the through-bore formed in the optical element, the optical element body can be formed of a material having a greater light-absorption or be completely light-impermeable.

For the use of the inventive beamsplitter in an optical alignment tool, the reach of the output beams plays an important role in the possibility of using the alignment tool as alignment means in constructional industry where a large distance range is often required. To achieve a greater reach, advantageously, the light source is formed as a laser diode, and the collimator is formed, advantageously, of a non-spherical lens. The collimator lens is arranged upstream of the reflecting surfaces and, in case a parting element is used, upstream of the parting element, in the path of the primary light beam. The collimator lens expands the primary light beam to a necessary beam diameter.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
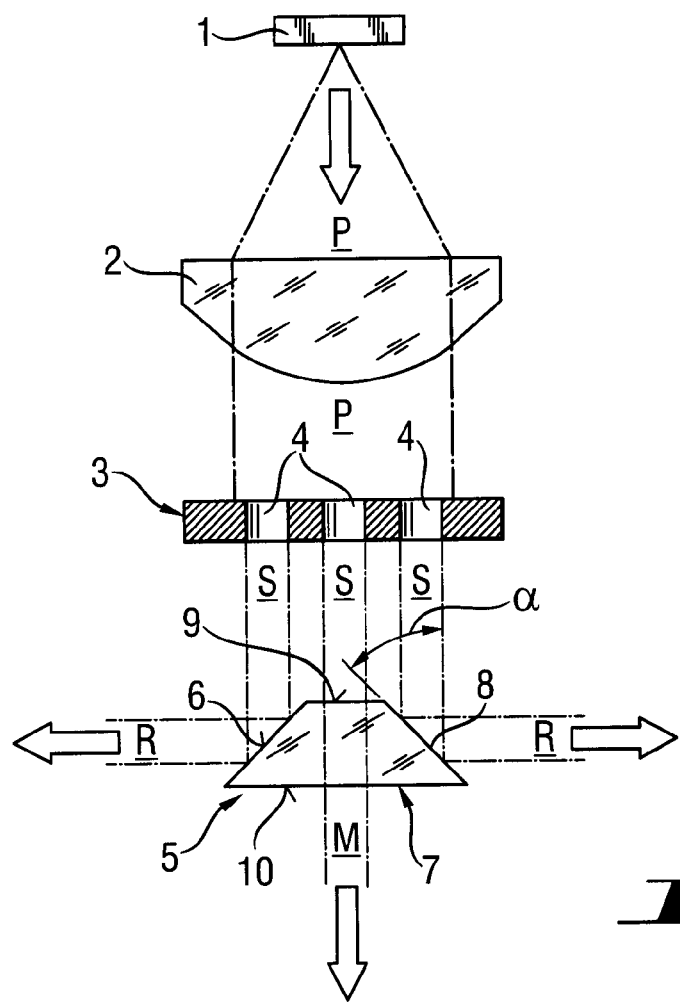
FIG. 1 a schematic view of an optical device of an optical alignment tool with a beamsplitter according to the present invention.

An optical device of an optical alignment tool, a principal construction or design of which is known, e.g., from U.S. Pat. No. 5,144,487, and is not important for understanding of the present invention, and which is shown in FIG. 1, includes a light source 1, e.g., a laser diode that emits a primary light beam P, and a collimator 2 arranged in the path of the light beam P. The collimator 2 converts the primary light beam P into a plurality of collimated parallel light beams. The collimator 2 can be formed as a collimator lens, such as a non-spherical lens or as an arrangement of cylindrical lenses. The collimated beam reaches a parting device 3 formed, e.g., as an apertured diaphragm having a plurality of through-openings 4 for the collimated beam. The diameter of the through-openings 4 can amount, e.g., from about 1.5 mm to about 3 mm. The scattering device or the apertured diaphragm 3 splits the collimated beam in a plurality of parallel, visibly separated from each other, separate primary beams S. The primary separate beams S reach a beamsplitter 5 located in the path of the separate primary beams S.

Figure 2:
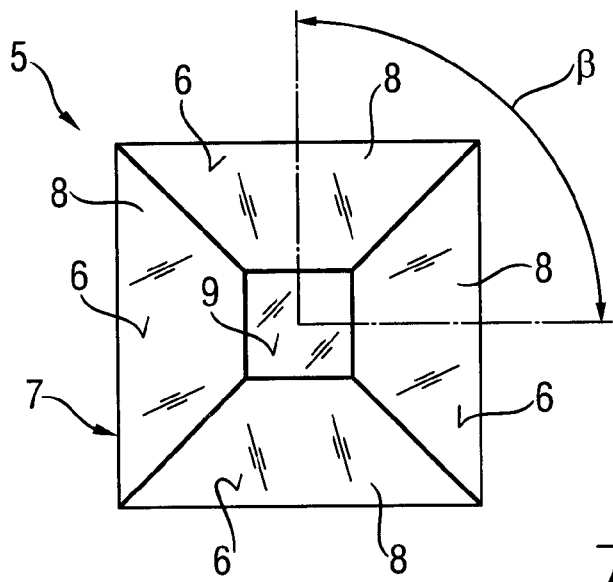
FIG. 2 a plan view of the beamsplitter shown in FIG. 1.

The beamsplitter 5 is formed of a plurality of reflecting surfaces 6 which are inclined to the propagation direction of the primary beams S at an angle $\alpha$ of 45° and are spaced from the collimator 2 by the same distance. As shown in FIG. 1 and, in particular, in FIG. 2, the reflecting surfaces 6 are provided on an optical element 7 having a shape of a truncated pyramid and the side surfaces 8 of which form with each other an angle $\beta$ of 90°, respectively. Advantageously, the side surfaces 8 are arranged in a square. The reflecting surface 6 extends, in the embodiment shown in FIG. 2, over the entire side surface 8 and are formed by being coated with metal, e.g., by vapor deposition of an aluminum coating. The arrangement of the beam splitter in the beam path of the separate beams S is so selected that each primary separate beam S, after being separated by the apertured diaphragm 3, falls on one of the four reflecting surfaces 6. The inclined at 45°, reflecting surface 6 diverges the primary beam S by 90° which is emitted from the housing of the alignment tool as an output beam R. The four reflecting surfaces 6 of the beamsplitter 5 produce four output beams R, with respective two output beams R propagating parallel to each other but in opposite directions. The four output beams R extend in a plane extending perpendicular to the propagation direction of the primary light beam P.

The truncated pyramid-shaped, optical element 7 is formed of a glass having a very small light-absorbing capacity with regard to the wave length of the light beam reaching its surface. The optical element has parallel top and bottom surfaces 9 and 10, respectively, which extend perpendicular to the propagation direction of the primary light beam P. Thereby, the central portion M of the primary light beam P can propagate through the central region of the optical element 7, which is surrounded by the reflecting surfaces 6, without any substantial hindrance. The optical element, which forms the beamsplitter, can also be formed as a truncated cone. In this case, the reflecting surfaces are formed, by grinding, e.g., as facets in the lateral surface of the truncated cone.

The output beams R and M, which are emitted by the beamsplitter 5, form a system of Cartesian coordinates. The output beams R reflected from the reflecting surfaces 6 form positive and negative sections of two orthogonal coordinates. The central portion M of the primary light beam P, which propagate unhindered through the central portion of the optical element 7, forms the third orthogonal axis. Because all of the reflecting surfaces 6 are equally spaced from the light source 1, the reflection of the separate primary beams S, which reach the respective reflecting surfaces 6, is effected in the same plane. Therefore, the reflected output beams R have the same virtual origin in the center of the optical element 7. The central portion M of the primary light beam P likewise has the same virtual origin as the output beams R. Thus, all of the five output beams R and M, which leave the beamsplitter 5, have the same virtual origin and define a system of Cartesian coordinates that does not have a zero point error.

Figure 3:
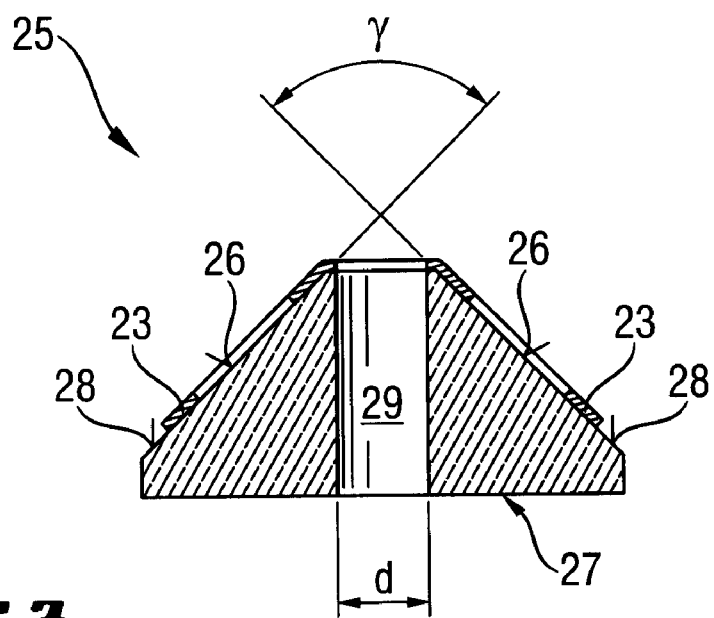
FIG. 3 an axial cross-sectional view of another embodiment of a beamsplitter according to the present invention.
Figure 4:
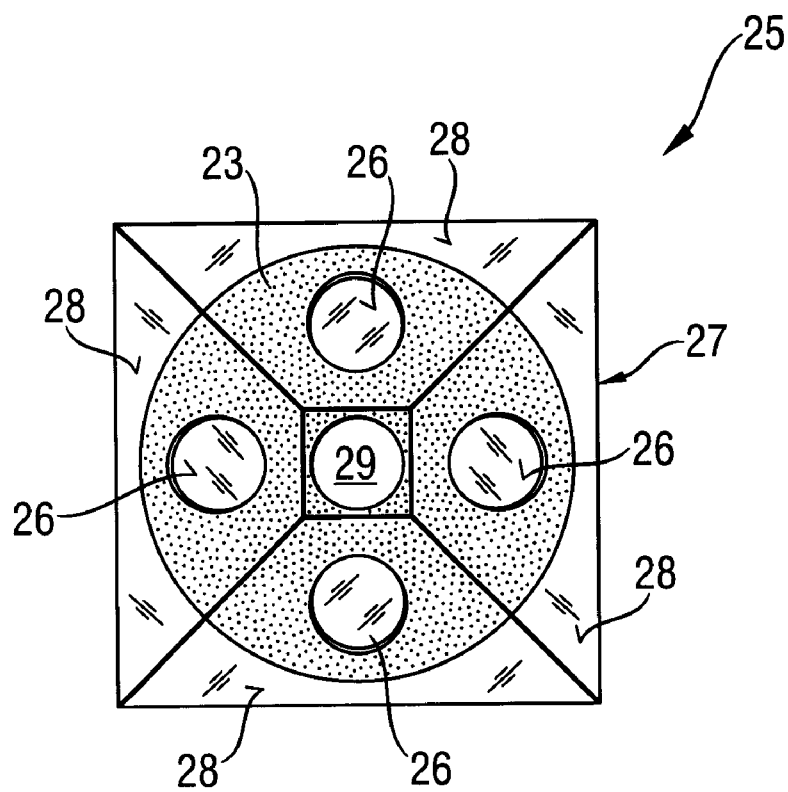
FIG. 4 a plan view of the beamsplitter shown in FIG. 3.

The embodiment of a beamsplitter according to the present invention, which is shown in FIGS. 3–4, is generally designated with a reference numeral 25. The beamsplitter 25 is again formed of an optical element 27 shaped as a truncated pyramid with four side surfaces 28, preferably arranged in a square. The side surfaces 28 are inclined each at angle of 45° to the axis of the optical element 27 and form with each other a top angle ε of 90°. The optical element 27 can be formed of separate segments or be formed as a one-piece element. The reflecting surfaces 26 are formed by a partial metalization of the side surfaces 28 and extend only over portions of side surfaces 28. A larger part of the side surfaces 28 is provided with a light-permeable coating 23 which serves for separating and spatial delimitation of the collimated primarily light beams reaching the beamsplitter 25. With such beamsplitter 25, a special parting device such as, e.g., an apertured diaphragm, can be eliminated. The splitting and spatial delimitation of the separate primary light beams is effected by the reflection regions, at the reflecting surfaces themselves. The central region of the optical element 27, which is limited by side surfaces 28 or by the light-permeable regions 23 and is surrounded by the reflecting surfaces 26, has a through-bore 29 that provides for an unhindered passage there-through of the central portion of the primary light beam. The diameter of the bore 29 amounts to e.g., from about 1.5 mm to about 3 mm. All of the reflecting surfaces 26, which are surrounded by the light-permeable coating 23, have substantially the same size. The optical element 27 can be formed of a material having a greater light-absorption.

The present invention has been explained with reference to beam-splitters having four reflecting surfaces. However, already three output beams are sufficient for forming a system of Cartesian coordinates. Therefore, it should be understood that the beamsplitter can have only two reflecting surfaces arranged perpendicular to each other and inclined to the collimated primary light beam at an angle of 45°. The reflecting surfaces are spaced from the collimator by the same distance and extend into the path of the primary light beam in such a way that a portion of the primary light beam can propagate through the beamsplitter without any hindrance. The output beams emitted by the beamsplitter form with each other an angle of 90° and have the same virtual origin.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A beamsplitter for use in an optical alignment tool having a light source (1) for emitting a primary light beam (P) and a collimator (2) arranged downstream of the light source (1) for collimating the primary light beam (P), the beamsplitter comprising at least two reflecting surfaces (6; 26) extendable into a path of a collimated light beam for emitting two output beams and to be located at a same distance from the collimator (2), the at least two reflecting surfaces (6; 26) forming a right angle with each other so that the two reflecting surfaces, when used in the optical alignment tool, are inclined each at an angle of 45° to a propagation direction of a collimated primary light beam (P); and a light passage (29) provided in a space between the reflecting surfaces (6, 26) and to be located substantially symmetrical to an optical axis of the collimator for enabling passing through the light passage (29) a central portion (M) of the collimated primary light beam.

2. A beamsplitter as set forth in claim 1, comprising four reflecting surfaces to be equidistantly spaced from the collimator and extendable into the path of the collimated primary light beam so that the central portion (M) of the collimated light beam passes substantially unhindered through a central region of the beamsplitter defined in the reflecting surfaces.

3. A beamsplitter as set forth in claim 2, wherein the four reflecting surfaces are arranged in a square.

4. A beamsplitter as set forth in claim 2, wherein the beamsplitter is formed as an optical element (7) having side surfaces (8) at least partially metal-coated for forming the reflecting surfaces, and top and bottom surfaces (9, 10) extending parallel to each other and perpendicular to the propagation direction of the collimated primary light beam (P), and wherein the light passage for passing the central portion (M) of the collimated primary light beam (P) extends through the top end bottom surfaces.

5. A beamsplitter as set forth in claim 4, wherein the optical element (7) is formed as a one-piece part shaped as a truncated pyramid.

6. A beamsplitter as set forth in claim 4, wherein the light passage for passing the central portion (M) of the collimated light beam (P) is formed as a through-bore (29) interspersing the top and bottom surfaces (9, 10).

7. An optical alignment tool, comprising a light source (1) for emitting a primary light beam (P); a collimator arranged downstream of the light source for collimating the primary light beam (P); a beamsplitter for splitting a light beam in a plurality of separate beams and having at least two reflecting surfaces (6;26) inclined each at an angle of 45° to a propagation direction of the collimated primary light beam (P), forming a right angle with each other, located at a same distance from the collimator (2), and extending into a path of the collimated light beam for emitting two output beams, and a light passage (9, 10; 29) provided in a space between the reflecting surfaces (6, 26) and extending substantially symmetrical to an optical axis of the collimator (2) for enabling a central portion (M) of the collimated primary light beam, and parting means (3, 23) for dividing the collimated primary light beam ({) in a plurality of separate light beams (S) extending parallel to each other before splitting the primary light beam (P) into a plurality of output beams (R, M).

8. An optical alignment tool as set forth in claim 7, wherein the parting means is formed as an apertured diaphragm (3) arranged between the collimator and the beamsplitter and a number of openings (4) in which corresponds to a number of the reflecting surfaces (6) of the beamsplitter increased by one.

9. An optical alignment tool as set forth in claim 7, wherein the parting means (23) is formed as light-absorbing areas surrounding each of the reflecting surfaces.

10. An optical alignment tool as set forth in claim 9, wherein the absorbing regions are formed as metal-coated surfaces.

11. An optical alignment tool as set forth in claim 7, wherein the light source comprises a laser diode, and wherein the collimator is formed as a collimator lens means.

12. An optical alignment tool as set forth in claim 11, wherein the collimator lens means comprises a non-spherical lens.

* * * * *